(12) United States Patent
Mizomori

(10) Patent No.: US 12,244,976 B2
(45) Date of Patent: Mar. 4, 2025

(54) PROJECTOR CONTROLLING METHOD AND DISPLAY SYSTEM

(71) Applicant: SEIKO EPSON CORPORATION, Tokyo (JP)

(72) Inventor: Masaki Mizomori, Beppu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 65 days.

(21) Appl. No.: 18/156,018

(22) Filed: Jan. 18, 2023

(65) Prior Publication Data

US 2023/0231978 A1 Jul. 20, 2023

(30) Foreign Application Priority Data

Jan. 19, 2022 (JP) .................. 2022-006172

(51) Int. Cl.
*H04N 9/31* (2006.01)
(52) U.S. Cl.
CPC ......... *H04N 9/3185* (2013.01); *H04N 9/3147* (2013.01)
(58) Field of Classification Search
CPC .. H04N 9/3185; H04N 9/3147; H04N 9/3194; H04N 9/3182; G09G 5/37; G03B 21/26; G03B 21/142
See application file for complete search history.

(56) References Cited

U.S. PATENT DOCUMENTS

| 2014/0111536 | A1  | 4/2014 | Shinozaki |           |
|--------------|-----|--------|-----------|-----------|
| 2016/0188123 | A1* | 6/2016 | Fujiune   | H04N 9/3158 |
|              |     |        |           | 345/156   |
| 2021/0302810 | A1* | 9/2021 | Kinoshita | G03B 21/2013 |

FOREIGN PATENT DOCUMENTS

| JP | 2015-022043 A | 2/2015 |
|----|---------------|--------|
| JP | 2017-169204 A | 9/2017 |
| JP | 2020-080064 A | 5/2020 |

* cited by examiner

*Primary Examiner* — Yassin Alata
(74) *Attorney, Agent, or Firm* — Oliff PLC

(57) ABSTRACT

A projector controlling method includes causing at least one of a first projector and a second projector to accept an instruction of movement of a region where a first image is projected from a first region to a third region and movement of a region where a second image is projected from a second region to a fourth region, upon reception of the instruction, causing the first projector to move the first image from the first region to the third region at a first movement speed, and causing the second projector to move the second image from the second region to the fourth region at a second movement speed.

6 Claims, 7 Drawing Sheets

PROJECTOR CONTROLLING METHOD AND DISPLAY SYSTEM

The present application is based on, and claims priority from JP Application Serial Number 2022-006172, filed Jan. 19, 2022, the disclosure of which is hereby incorporated by reference herein in its entirety.

BACKGROUND

1. Technical Field

The present disclosure relates to a projector controlling method and a display system.

2. Related Art

There is a known technology for using a plurality of projectors to project a single image (see JP-A-2017-169204, for example).

JP-A-2017-169204 describes that a plurality of projectors are used to project a single image, and that the projectors each adjust rotation of the projection image and translate the projection image.

The plurality of projectors described in JP-A-2017-169204 do not show, when adjusting the projection region, a user the progress from the projection region before the adjustment to the projection region after the adjustment, so that the user is unlikely to be able to check the content of the adjustment of the projection region. As a result, the convenience of the user is likely to deteriorate.

SUMMARY

A projector controlling method according to an aspect of the present disclosure includes projecting, by a first projector, a first image onto a first region of a projection surface, projecting, by a second projector, a second image onto a second region of the projection surface, accepting an instruction of movement of a region where the first image is projected from the first region to a third region and movement of a region where the second image is projected from the second region to a fourth region, and upon reception of the instruction, moving the first image from the first region to the third region at a first movement speed by controlling the first projector, and moving the second image from the second region to the fourth region at a second movement speed by controlling the second projector, and the first image projected onto the third region and the second image projected onto the fourth region form a single image.

A display system according to another aspect of the present disclosure includes a first projector and a second projector. The first projector projects a first image onto a first region of a projection surface. The second projector projects a second image onto a second region of the projection surface. At least one of the first projector and the second projector accepts an instruction of movement of a region where the first image is projected from the first region to a third region and movement of a region where the second image is projected from the second region to a fourth region. Upon reception of the instruction, the first projector moves the first image from the first region to the third region at a first movement speed, and the second projector moves the second image from the second region to the fourth region at a second movement speed. The first image projected onto the third region and the second image projected onto the fourth region form a single image.

DESCRIPTION OF EXEMPLARY EMBODIMENTS

An embodiment will be described below with reference to the drawings.

1. Configuration of Display System

Figure 1:
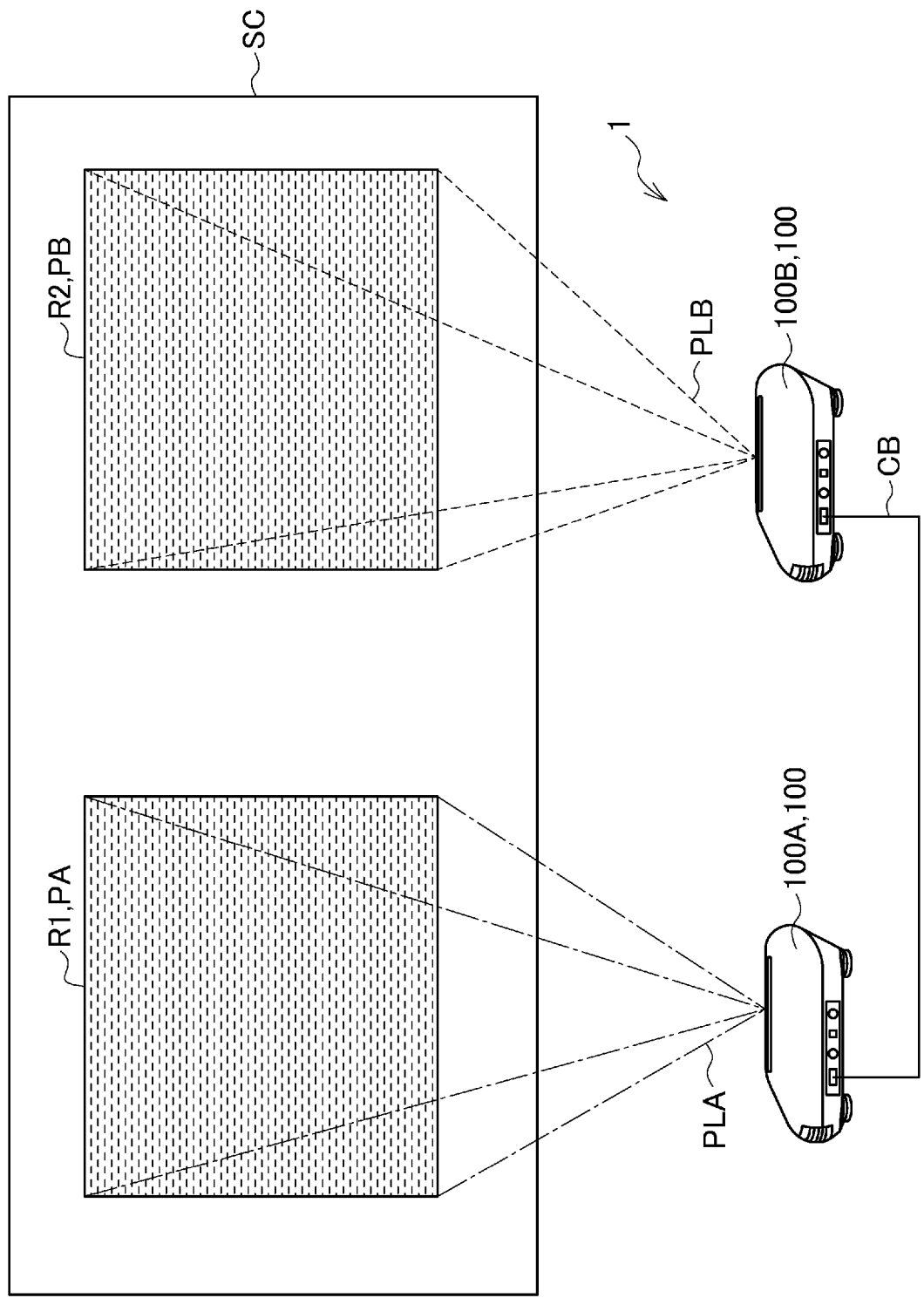
FIG. 1 shows an example of the configuration of a display system according to an embodiment of the present disclosure.

FIG. 1 shows an example of the configuration of a display system 1 according to the present embodiment.

The display system 1 includes a first projector 100A and a second projector 100B. The first projector 100A and the second projector 100B are communicably coupled to each other via a cable CB.

The first projector 100A projects a first image PA onto a first region R1 of a screen SC. The first projector 100A displays the first image PA in the first region R1 of the screen SC, for example, by projecting projection light PLA toward the screen SC.

The second projector 100B projects a second image PB onto a second region R2 of the screen SC. The second projector 100B projects the second image PB onto the second region R2 of the screen SC, for example, by projecting projection light PLB toward the screen SC. The first image PA and the second image PB are each, for example, a pattern image PP. On the screen SC, for example, the first region R1 is placed on the left of the second region R2.

The screen SC corresponds to an example of a "projection surface".

FIG. 1 shows an example of floor-standing installation in which the first projector 100A and the second projector 100B are installed on a floor in front of the screen SC, but ceiling-suspended installation may, for example, be employed, that is, the projectors 100 are suspended from a ceiling. The present embodiment will be described with reference to a case where the first projector 100A and the second projector 100B perform projection onto the screen SC, which is a planar surface, but the projection target is not limited to the screen SC and may be a planar surface, such as a wall surface of a building, or a curved or uneven surface.

The first projector 100A and the second projector 100B are communicably coupled to each other in accordance, for example, with the Ethernet (registered trademark) standard.

When the first projector 100A accepts, for example, a movement instruction from a user, the first projector 100A transmits movement instruction information CM to the second projector 100B. The movement instruction information CM is, for example, information that instructs movement of the first image PA from the first region R1 to a third region R3 at a first movement speed V1, and movement of the second image PB from the second region R2 to a fourth region R4 at a second movement speed V2. The third region R3 is a target region to which the first image PA is moved. The fourth region R4 is a target region to which the second image PB is moved.

The third region R3 and the fourth region R4 will be further described with reference to FIG. 4.

2. Configuration of Projectors

Figure 2:
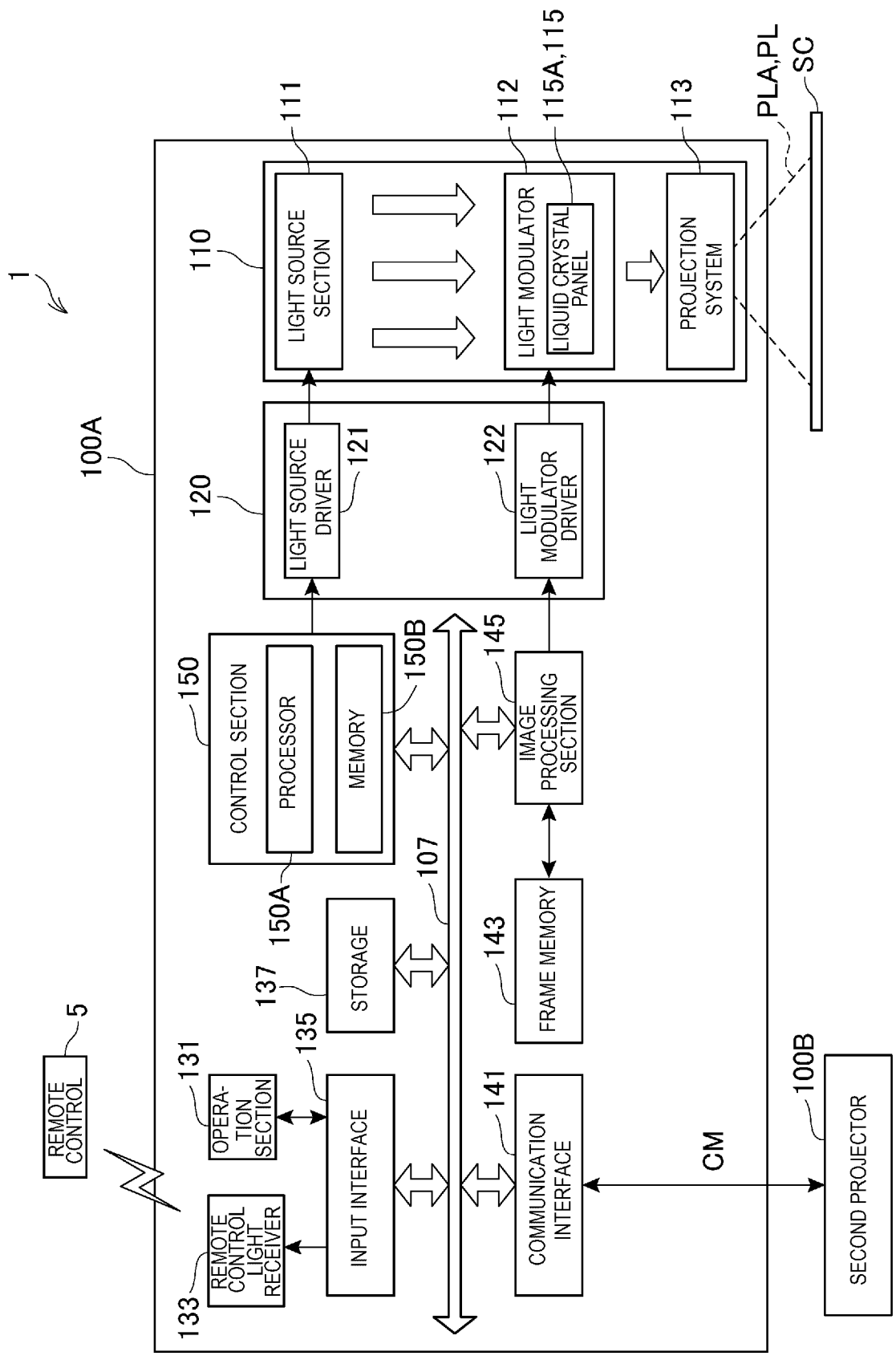
FIG. 2 shows an example of the configuration of a projector according to the present embodiment.

FIG. 2 shows an example of the configuration of the projectors 100 according to the present embodiment. The configuration of the first projector 100A will be described with reference to FIG. 2. The second projector 100B has the same configuration as that of the first projector 100A, and the first projector 100A and the second projector 100B may therefore be referred to as projectors 100 in a case where the first projector 100A and the second projector 100B are not distinguished from each other.

The projectors 100 each include a projection section 110 and a driver 120, which drives the projection section 110. The projection section 110 forms an optical image and projects the image on the screen SC.

The projection section 110 includes a light source section 111, a light modulator 112, and a projection system 113. The driver 120 includes a light source driver 121 and a light modulator driver 122.

The light source section 111 includes a lamp, such as a halogen lamp, a xenon lamp, and an ultrahigh-pressure mercury lamp, or a solid-state light source, such as an LED (light emitting diode) and a laser light source.

The light source section 111 may include a reflector and an auxiliary reflector that guide the light outputted from the light source to the light modulator 112. The light source section 111 may further include, for example, the following optical elements for enhancing the optical characteristics of the projection light: a lens group; a polarizer; or a light adjusting element that is disposed in the path to the light modulator 112 and attenuates the amount of light outputted by the light source.

The light source driver 121 is coupled to an internal bus 107 and turns on and off the light source of the light source section 111 in accordance with an instruction from a control section 150 coupled to the internal bus 107.

The light modulator 112 includes, for example, three liquid crystal panels 115 corresponding to the three primary colors, R, G, and B. The characters R, G, and B represent red, green, and blue, respectively. That is, the light modulator 112 includes a liquid crystal panel 115 corresponding to the R light, a liquid crystal panel 115 corresponding to the G light, and a liquid crystal panel 115 corresponding to the B light.

The light outputted by the light source section 111 is separated into three color luminous fluxes of the R light, the G light, and the B light, which enter the liquid crystal panels 115 corresponding thereto. Each of the three liquid crystal panels 115 is a transmissive liquid crystal panel and modulates the luminous flux passing therethrough to produce image light PL. The image light PL having passed through each of the liquid crystal panels 115 and having therefore been modulated is combined with the others by a light combining system, such as a cross dichroic prism, and the combined image light PL exits toward the projection system 113.

In the following description, the liquid crystal panels 115 of the first projector 100A are called first liquid crystal panels 115A, and the liquid crystal panels 115 of the second projector 100B are called second liquid crystal panels 115B in some cases.

The light modulator 112 is driven by the light modulator driver 122. The light modulator driver 122 is coupled to an image processing section 145.

Image data corresponding to the RGB primary colors are inputted from the image processing section 145 to the light modulator driver 122. The light modulator driver 122 converts the inputted image data into data signals suitable for the operation of the liquid crystal panels 115. The light modulator driver 122 applies voltage to each pixel of each of the liquid crystal panels 115 based on the data signals as a result of the conversion to draw an image on the liquid crystal panel 115.

The projection system 113 includes a lens, a mirror, and other components that bring the incident image light PL into focus on the screen SC. The projection system 113 may further include, for example, a zoom mechanism that enlarges or reduces an image to be projected on the screen SC and a focus adjustment mechanism that performs focus adjustment.

The projectors 100 further each include an operation section 131, a remote control light receiver 133, an input interface 135, a storage 137, a communication interface 141, a frame memory 143, the image processing section 145, and the control section 150. The input interface 135, the storage 137, the communication interface 141, the image processing section 145, and the control section 150 are coupled to each other via the internal bus 107 in a data communicable manner.

The operation section 131 includes a variety of buttons and switches provided at the surface of an enclosure of the projector 100, generates an operation signal corresponding to operation performed on any of the buttons and switches, and outputs the generated operation signal to the input interface 135. The input interface 135 outputs the operation signal inputted from the operation section 131 to the control section 150.

The remote control light receiver 133 receives an infrared signal transmitted from a remote control 5 and decodes the received infrared signal to generate an operation signal. The remote control light receiver 133 outputs the generated operation signal to the input interface 135. The input interface 135 outputs the operation signal inputted from the remote control light receiver 133 to the control section 150.

The storage is a nonvolatile storage 137 apparatus, such as an HDD (hard disk drive) and an SSD (solid state drive). The storage 137 stores, for example, a program executed by the control section 150, data processed by the control section 150, and image data.

The communication interface 141 includes a connector and an interface circuit and transmits the movement instruction information CM to the second projector 100B. In the present embodiment, the communication interface 141 is an interface for communication with the second projector 100B according, for example, to the Ethernet standard. The communication interface 141 is communicably coupled to the second projector 100B via the cable CB.

The control section 150 includes a processor 150A and the memory 150B.

The memory 150B is a storage apparatus that stores in a nonvolatile manner a program executed by the processor 150A and data processed by the processor 150A. The memory 150B is formed of a magnetic storage apparatus, a semiconductor storage device such as a flash ROM (read only memory), or any other type of nonvolatile storage apparatus. The memory 150B may include a RAM (random access memory) that forms a work area for the processor 150A. The memory 150B may also include an HDD, an SSD, or any other nonvolatile storage apparatus.

The memory 150B stores data to be processed by the control section 150 and a control program 154 executed by the processor 150A.

The processor 150A may be formed of a single processor, or a plurality of processors may function as the processor 150A. The processor 150A executes the control program 154 to control each portion of the projector 100. For example, the processor 150A outputs an instruction of execution of image processing corresponding to operation accepted by the operation section 131 or the remote control 5 and parameters used in the image processing to the image processing section 145. The parameters include, for example, a geometric correction parameter for correcting geometric distortion of an image to be projected on the screen SC. The processor 150A further controls the light source driver 121 to turn on and off the light source section 111.

The control section 150, the image processing section 145, and the frame memory 143 can each be formed, for example, of an integrated circuit. The integrated circuit includes an LSI, an ASIC (application specific integrated circuit), and a PLD (programmable logic device). The PLD includes, for example, an FPGA (field-programmable gate array). An analog circuit may form part of the configuration of the integrated circuit, or the integrated circuit may be combined with a processor. The combination of the integrated circuit and a processor is called, for example, a microcontroller (MCU), an SoC (System-on-a-chip), a system LSI, and a chipset.

The image processing section 145 develops in the frame memory 143 image data stored in the memory 150B or the storage 137. The frame memory 143 includes a plurality of banks. The banks each have storage capacity that allows image data corresponding to one frame to be written to the bank. The frame memory 143 is formed, for example, of an SDRAM (synchronous dynamic random access memory).

The image processing section 145 performs image processing on the image data developed in the frame memory 143, for example, resolution conversion or resizing, distortion correction, shape correction, digital zooming, and image tone and luminance adjustment.

The image processing section 145 converts an input frame frequency of the vertical sync signal into a drawing frequency to generate a vertical sync signal having the drawing frequency. The generated vertical sync signal is also called an output sync signal. The image processing section 145 outputs the generated output sync signal to the light modulator driver 122.

3. Configuration of Control Section

Figure 3:
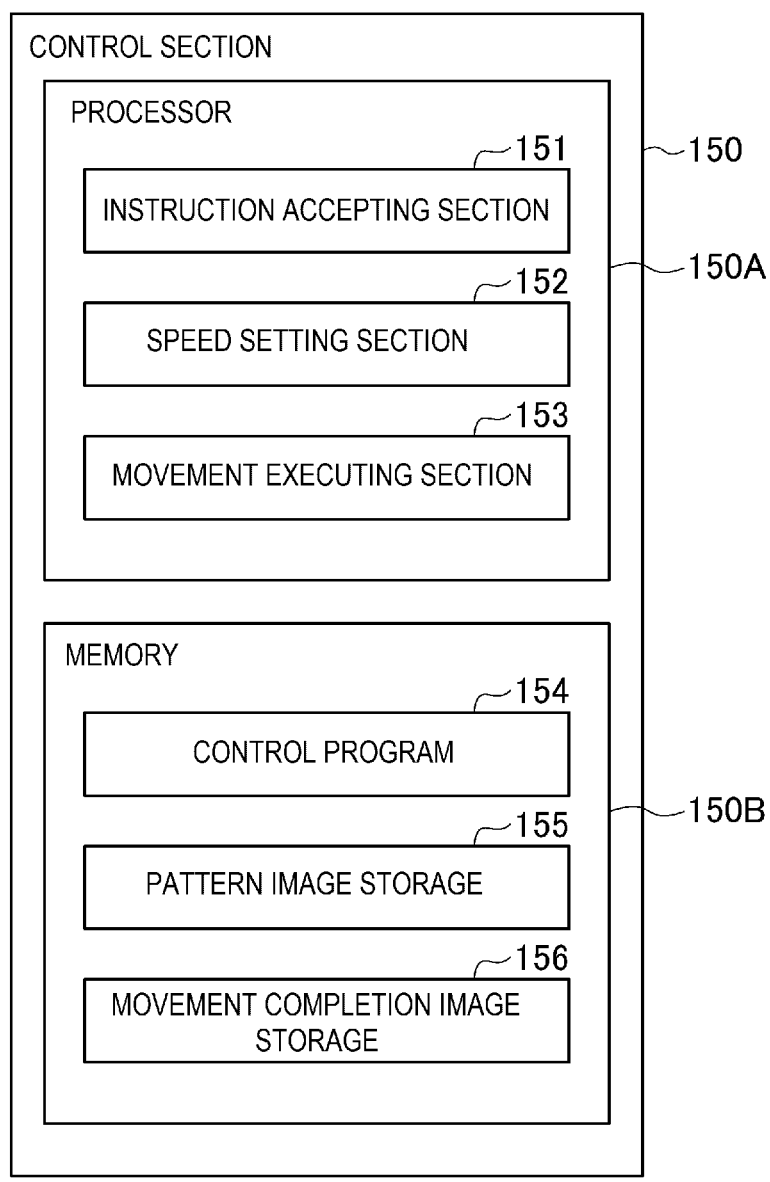
FIG. 3 shows an example of the configuration of a control section of the projector.

FIG. 3 shows an example of the configuration of the control section 150 of each of the projectors 100. In FIG. 3, the configuration of the control section 150 of the first projector 100A will be described. The control section 150 of the second projector 100B has the same configuration as that of the control section 150 of the first projector 100A, and the control section 150 of the first projector 100A and the control section 150 of the second projector 100B are therefore called the control sections 150 in some cases when the control sections 150 of the two projectors are not distinguished from each other.

The control section 150 includes an instruction accepting section 151, a speed setting section 152, a movement executing section 153, a pattern image storage 155, and a movement completion image storage 156, as shown in FIG. 3. Specifically, the processor 150A of the control section 150 executes the control program 154 stored in the memory 150B to function as the instruction accepting section 151, the speed setting section 152, and the movement executing section 153. Furthermore, the processor 150A of the control section 150 executes the control program 154 stored in the memory 150B to cause the memory 150B to function as the pattern image storage 155 and the movement completion image storage 156.

The pattern image storage 155 stores the pattern image PP. When the first image PA is displayed in the first region R1, the pattern image PP is displayed as the first image PA. The pattern image PP is displayed when the position, shape, and size of the region where the first image PA is displayed, the color of the first image PA, and other factors of the first image PA are adjusted.

The movement completion image storage 156 stores a first movement completion image PE1. The first movement completion image PE1 is an image indicating that the first image PA has been moved to the third region R3 and the second image PB has been moved to the fourth region R4. The first movement completion image PE1 is displayed as the first image PA by the movement executing section 153 when the first image PA has reached the third region R3 from the first region R1 and the second image PB has reached the fourth region R4 from the second region R2.

In the present embodiment, the third region R3 and the fourth region R4 are so placed at the screen SC that the first image PA projected in the third region R3 and the second image PB projected in the fourth region R4 form a single image PT. Specifically, the first image PA projected in the third region R3 and the second image PB projected in the fourth region R4 undergo what is called "tiling projection" to form the single image PT. The single image PT is, for example, a movement completion image PE.

The movement completion image PE will be further described with reference to FIG. 4.

Similarly, the movement completion image storage 156 of the second projector 100B stores a second movement completion image PE2. The second movement completion image PE2 is an image indicating that the first image PA has been moved to the third region R3 and the second image PB has been moved to the fourth region R4. The second movement completion image PE2 is displayed as the second image PB by the movement executing section 153 of the second projector 100B when the first image PA has reached the third region R3 from the first region R1 and the second image PB has reached the fourth region R4 from the second region R2.

In the present embodiment, the first image PA and the second image PB are placed side by side in the rightward-leftward direction of the screen SC to form the single image PT. In the single image PT, the first movement completion image PE1 projected in the third region R3 is, for example, the left half of the movement completion image PE, and the second movement completion image PE2 projected in the fourth region R4 is, for example, the right half of the movement completion image PE.

In the present embodiment, the first image PA and the second image PB are placed side by side in the rightward-leftward direction of the screen SC to form the single image PT, but not necessarily. The first image PA and the second image PB may instead be placed side by side in the upward-downward direction of the screen SC to form the single image PT.

The instruction accepting section 151 accepts a movement instruction from the user in response to the user's operation on the operation section 131 or the remote control 5. The movement instruction is an instruction of movement of the first image PA from the first region R1 to the third region R3 and movement of the second image PB from the second region R2 to the fourth region R4. The first region R1 and the third region R3 each correspond to an example of a projection region where the first projector 100A performs projection. The second region R2 and the fourth region R4 each correspond to an example of a projection region where the second projector 100B performs projection.

The third region R3 and the fourth region R4 will be further described with reference to FIG. 4.

When the instruction accepting section 151 receives the movement instruction, the instruction accepting section 151 generates the movement instruction information CM and transmits the movement instruction information CM to the second projector 100B.

The present embodiment is described with reference to the case where the instruction accepting section 151 of the first projector 100A accepts the instruction of movement of the first image PA from the first region R1 to the third region R3 and movement of the second image PB from the second region R2 to the fourth region R4, but not necessarily. At least one of the first projector 100A and the second projector 100B may accept the instruction of movement of the first image PA from the first region R1 to the third region R3 and movement of the second image PB from the second region R2 to the fourth region R4.

Furthermore, the present embodiment is described with reference to the case where the first projector 100A accepts the movement instruction from the user, but not necessarily. The display system 1 may include an information processing apparatus, such as a personal computer, communicably coupled to the first projector 100A and the second projector 100B, and when the information processing apparatus accepts the movement instruction from the user, the information processing apparatus may transmit the movement instruction information CM to the first projector 100A and the second projector 100B.

Still instead, the movement instruction information CM may contain first movement instruction information CM1 and second movement instruction information CM2, and the information processing apparatus may transmit the first movement instruction information CM1 to the first projector 100A and the second movement instruction information CM2 to the second projector 100B. The first movement instruction information CM1 is information that instructs movement of the first image PA from the first region R1 to the third region R3. The second movement instruction information CM2 is information that instructs movement of the second image PB from the second region R2 to the fourth region R4.

The speed setting section 152 sets the first movement speed V1 based on a first distance L1 from the first region R1 to the third region R3.

Similarly, the speed setting section 152 of the second projector 100B sets the second movement speed V2 based on a second distance L2 from the second region R2 to the fourth region R4.

The speed setting section 152 sets the first movement speed V1 at a value greater than the second movement speed V2 when the first distance L1 from the first region R1 to the third region R3 is longer than the second distance L2 from the second region R2 to the fourth region R4. The speed setting section 152 sets the first movement speed V1 at a value smaller than the second movement speed V2 when the first distance L1 from the first region R1 to the third region R3 is shorter than the second distance L2 from the second region R2 to the fourth region R4.

The speed setting section 152 sets the first movement speed V1 and the second movement speed V2, for example, in such a way that the timing at which the first image PA reaches the third region R3 and the timing at which the second image PB reaches the fourth region R4 coincide with each other.

The first distance L1 and the second distance L2 will be further described with reference to FIG. 4.

The speed setting section 152 sets the first movement speed V1 at a first reference speed VH1 when the distance from the first region R1 to the first image PA is greater than or equal to a first threshold distance SL1. The speed setting section 152 sets the first movement speed V1 at a first decelerated speed VL1, which is smaller than the first reference speed VH1, when the distance from the first region R1 to the first image PA is smaller than the first threshold distance SL1.

Similarly, the speed setting section 152 of the second projector 100B sets the second movement speed V2 at a second reference speed VH2 when the distance from the second region R2 to the second image PB is greater than or equal to a second threshold distance SL2. The speed setting section 152 of the second projector 100B sets the second movement speed V2 at a second decelerated speed VL2, which is smaller than the second reference speed VH2, when the distance from the second region R2 to the second image PB is smaller than the second threshold distance SL2.

The speed setting section 152 sets the first movement speed V1 at the first reference speed VH1 when the distance from the first image PA to the third region R3 is greater than or equal to a third threshold distance SL3. The speed setting section 152 sets the first movement speed V1 at a third decelerated speed VL3, which is smaller than the first reference speed VH1, when the distance from the first image PA to the third region R3 is smaller than the third threshold distance SL3.

Similarly, the speed setting section 152 of the second projector 100B sets the second movement speed V2 at the second reference speed VH2 when the distance from the second image PB to the fourth region R4 is greater than or equal to a fourth threshold distance SL4. The speed setting section 152 of the second projector 100B sets the second movement speed V2 at a fourth decelerated speed VL4, which is smaller than the second reference speed VH2, when the distance from the second image PB to the fourth region R4 is smaller than the fourth threshold distance SL4.

The first reference speed VH1 corresponds to an example of a "reference speed". The third decelerated speed VL3 corresponds to an example of a "decelerated speed". The third threshold distance SL3 corresponds to an example of a "predetermined distance".

The first reference speed VH1, the first decelerated speed VL1, the third decelerated speed VL3, the first threshold distance SL1, and the third threshold distance SL3 will be further described with reference to FIG. 6.

The movement executing section 153 moves the first image PA from the first region R1 to the third region R3 at the first movement speed V1 set by the speed setting section 152. The movement executing section 153 moves the first image PA from the first region R1 to the third region R3, for example, by moving the position of the image generated at each of the first liquid crystal panels 115A. In other words, the movement executing section 153 uses what is called "digital shift function" to move the first image PA from the first region R1 to the third region R3.

Similarly, the movement executing section 153 of the second projector 100B moves the second image PB from the second region R2 to the fourth region R4 at the second movement speed V2 set by the speed setting section 152. The movement executing section 153 of the second projector 100B moves the second image PB from the second region R2 to the fourth region R4, for example, by moving the position of the image generated at each of the second liquid crystal panels 115B. In other words, the movement executing section 153 of the second projector 100B uses what is called "digital shift function" to move the second image PB from the second region R2 to the fourth region R4.

The movement executing section 153 reads the first movement completion image PE1 from the movement completion image storage 156 and d displays the first movement completion image PE1 as the first image PA when the first image PA reaches the third region R3 and the second image PB reaches the fourth region R4.

Similarly, the movement executing section 153 of the second projector 100B reads the second movement completion image PE2 from the movement completion image storage 156 and displays the second movement completion image PE2 as the second image PB when the first image PA reaches the third region R3 and the second image PB reaches the fourth region R4.

When the first image PA reaches the third region R3, the movement executing section 153 transmits information representing that the first image PA has reached the third region R3 to the second projector 100B. When the second image PB reaches the fourth region R4, the movement executing section 153 of the second projector 100B transmits information representing that the second image PB has reached the fourth region R4 to the first projector 100A.

4. Specific Example

Figure 4:
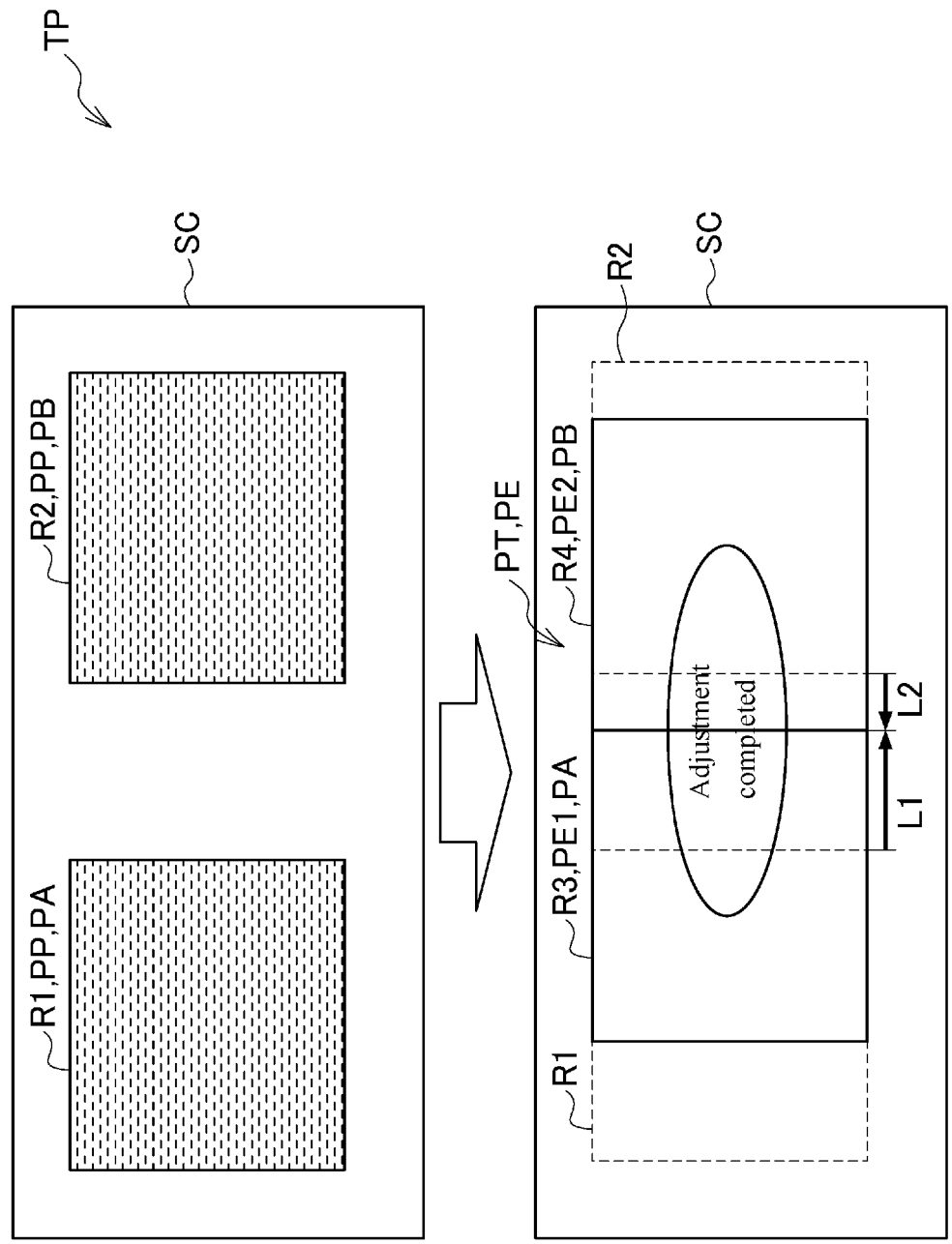
FIG. 4 is an image transition diagram showing an example of a change in an image displayed on a screen.

FIG. 4 is an image transition diagram TP showing an example of a change in an image displayed on the screen SC.

In the image transition diagram TP, the upper portion shows that the first image PA and the second image PB before the movement are displayed on the screen SC, and the lower portion shows that the first image PA and the second image PB after the movement are displayed on the screen SC.

Specifically, in the upper portion, the first projector 100A displays the pattern image PP as the first image PA in the first region R1 of the screen SC. The second projector 100B displays the pattern image PP as the second image PB in the second region R2 of the screen SC. The first region R1 is located in a left portion of the screen SC, and the second region R2 is located in a right portion of the screen SC. The first region R1 and the second region R2 are apart from each other.

In the lower portion, the movement executing section 153 of the first projector 100A displays the first movement completion image PE1 as the first image PA in the third region R3 of the screen SC. The movement executing section 153 of the second projector 100B displays the second movement completion image PE2 as the second image PB in the fourth region R4 of the screen SC.

The third region R3 is placed in a position where the first region R1 is shifted rightward by the first distance L1 on the screen SC. The fourth region R4 is placed in a position where the second region R2 is shifted leftward by the second distance L2 on the screen SC. In FIG. 4, the first distance L1 is longer than the second distance L2. In this case, the speed setting section 152, for example, sets the first movement speed V1 at a speed greater than the second movement speed V2.

In the present embodiment, the first region R1 and the third region R3 have the same shape and size. The second region R2 and the fourth region R4 also have the same shape and size. In other words, the adjustment of the projection regions in the present embodiment is movement of the projection regions.

The right end of the third region R3 is in contact with the left end of the fourth region R4. The first movement completion image PE1 displayed in the third region R3 and the second movement completion image PE2 displayed in the fourth region R4 form the movement completion image PE. The movement completion image PE corresponds to an example of the single image PT.

The movement completion image PE contains, for example, an elliptical figure image and a character image showing "adjustment completed" representing that the movement, that is, the adjustment of the projection regions has been completed.

When the single image PT is displayed by "tiling projection", the projection region where the first projector 100A performs projection and part of the projection region where the second projector 100B performs projection overlap with each other to generate an overlapping region, and edge blending is performed on the overlapping region. The present embodiment will be described for convenience with reference to a case where there is no such a region.

Figure 5:
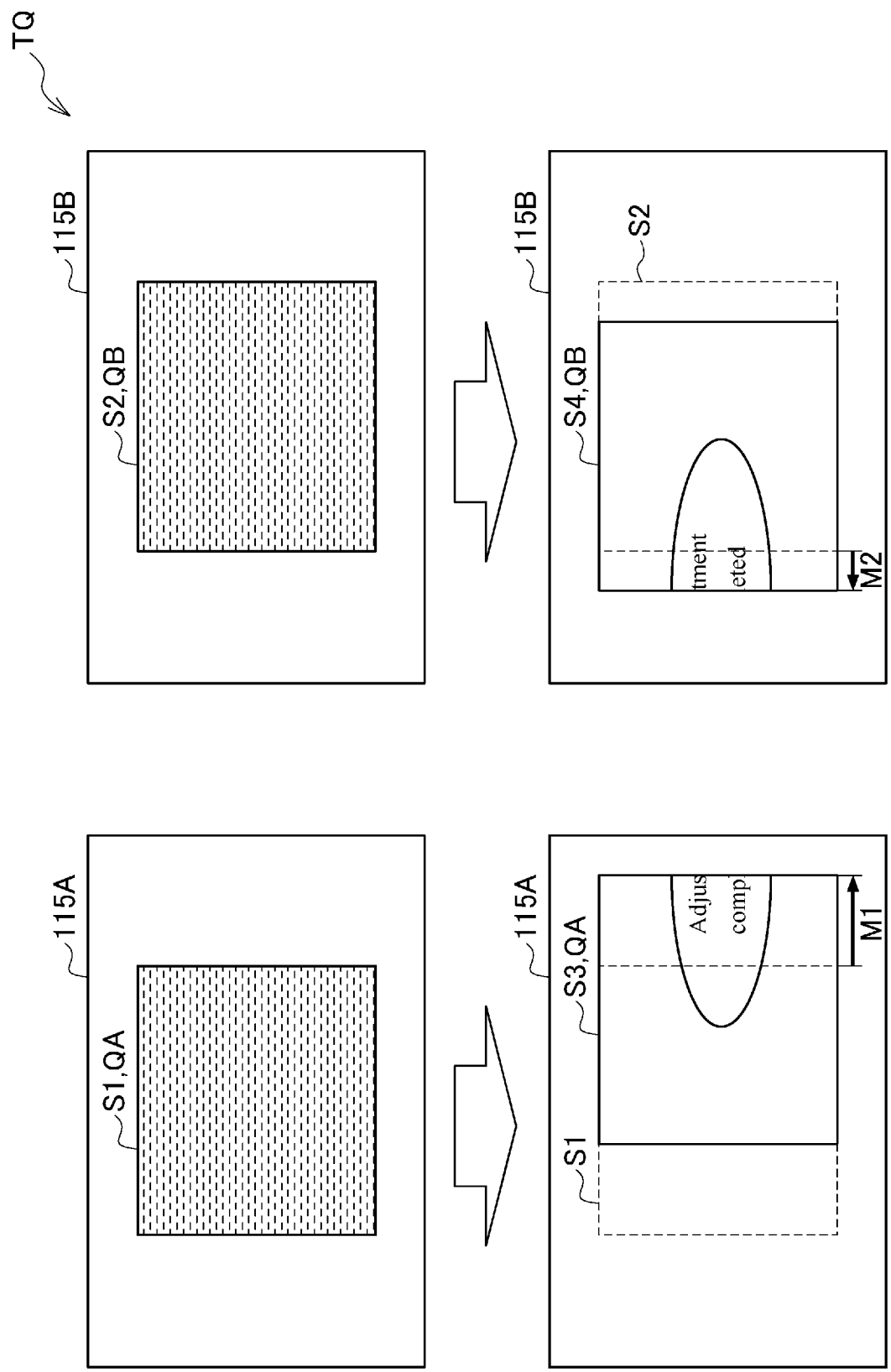
FIG. 5 is an image transition diagram showing an example of a change in an image displayed at a liquid crystal panel.

FIG. 5 is an image transition diagram TO showing an example of a change in an image displayed at any of the liquid crystal panels 115.

In the image transition diagram TO, the left side shows a change in the display position of a first image QA displayed at each of the first liquid crystal panels 115A of the first projector 100A, and the right side shows a change in the display position of a second image QB displayed at each of the second liquid crystal panels 115B of the second projector 100B.

The first image QA corresponds to the first image PA. That is, the first projector 100A projects the first image PA onto the screen SC by causing the first liquid crystal panels 115A to display the first image QA. The second image QB corresponds to the second image PB. That is, the second projector 100B projects the second image PB onto the screen SC by causing the second liquid crystal panels 115B to display the second image QB.

The change in the display position of the first image QA displayed at each of the first liquid crystal panels 115A of the first projector 100A will first be described with reference to the figure shown in the left portion of the image transition diagram TQ.

In the upper portion, the first image QA is displayed in a first region S1 of each of the first liquid crystal panels 115A. The first projector 100A displays the first image PA in the first region R1 of the screen SC by causing each of the first liquid crystal panels 115A to display the first image QA in the first region S1 of the first liquid crystal panel 115A.

The movement executing section 153 of the first projector 100A moves the first image QA from the first region S1 to a third region S3 of each of the first liquid crystal panels 115A, as shown in the lower portion. The first projector 100A moves the first image PA from the first region R1 to the third region R3 on the screen SC by causing each of the first liquid crystal panels 115A to move the first image QA from the first region S1 to the third region S3.

The third region S3 is placed in a position where the first region S1 is shifted rightward by a first distance M1. The first liquid crystal panels 115A each move the first image PA rightward by the first distance L1 on the screen SC by moving the first region S1 rightward by the first distance M1.

The change in the display position of the second image QB displayed at each of the second liquid crystal panels 115B of the second projector 100B will next be described with reference to the figure shown in the right portion of the image transition diagram TQ.

In the upper portion, the second image QB is displayed in the second region S2 of each of the second liquid crystal panels 115B. The second projector 100B displays the second image PB in the second region R2 of the screen SC by causing each of the second liquid crystal panels 115B to display the second image QB in the second region S2 of the second liquid crystal panel 115B.

The movement executing section 153 of the second projector 100B moves the second image QB from the second region S2 to the fourth region S4 of each of the second liquid crystal panels 115B, as shown in the lower portion. The second projector 100B moves the second image PB from the second region R2 to the fourth region R4 on the screen SC by causing each of the second liquid crystal panels 115B to move the second image QB from the second region S2 to the fourth region S4.

The fourth region S4 is placed in a position where the second region S2 is shifted leftward by a second distance M2. The second liquid crystal panels 115B each move the second image PB leftward by the second distance L2 on the screen SC by moving the second region S2 leftward by the second distance M2.

The first projector 100A moves the first image PA from the first region R1 to the third region R3 on the screen SC by causing the movement executing section 153 of the first projector 100A to move the first image QA from the first region S1 to the third region S3 of each of the first liquid crystal panels 115A, as described with reference to FIGS. 4 and 5. Similarly, the second projector 100B moves the second image PB from the second region R2 to the fourth region R4 on the screen SC by causing the movement executing section 153 of the second projector 100B to move the second image QB from the second region S2 to the fourth region S4 of each of the second liquid crystal panels 115B.

The first image PA can therefore be readily moved on the screen SC from the first region R1 to the third region R3. Similarly, the second image PB can be readily moved on the screen SC from the second region R2 to the fourth region R4.

Furthermore, the first movement speed V1, at which the first image PA moves from the first region R1 to the third region R3, can be readily adjusted. Similarly, the second movement speed V2, at which the second image PB moves from the second region R2 to the fourth region R4, can be readily adjusted.

The first movement speed V1 will be further described with reference to FIG. 6.

Figure 6:
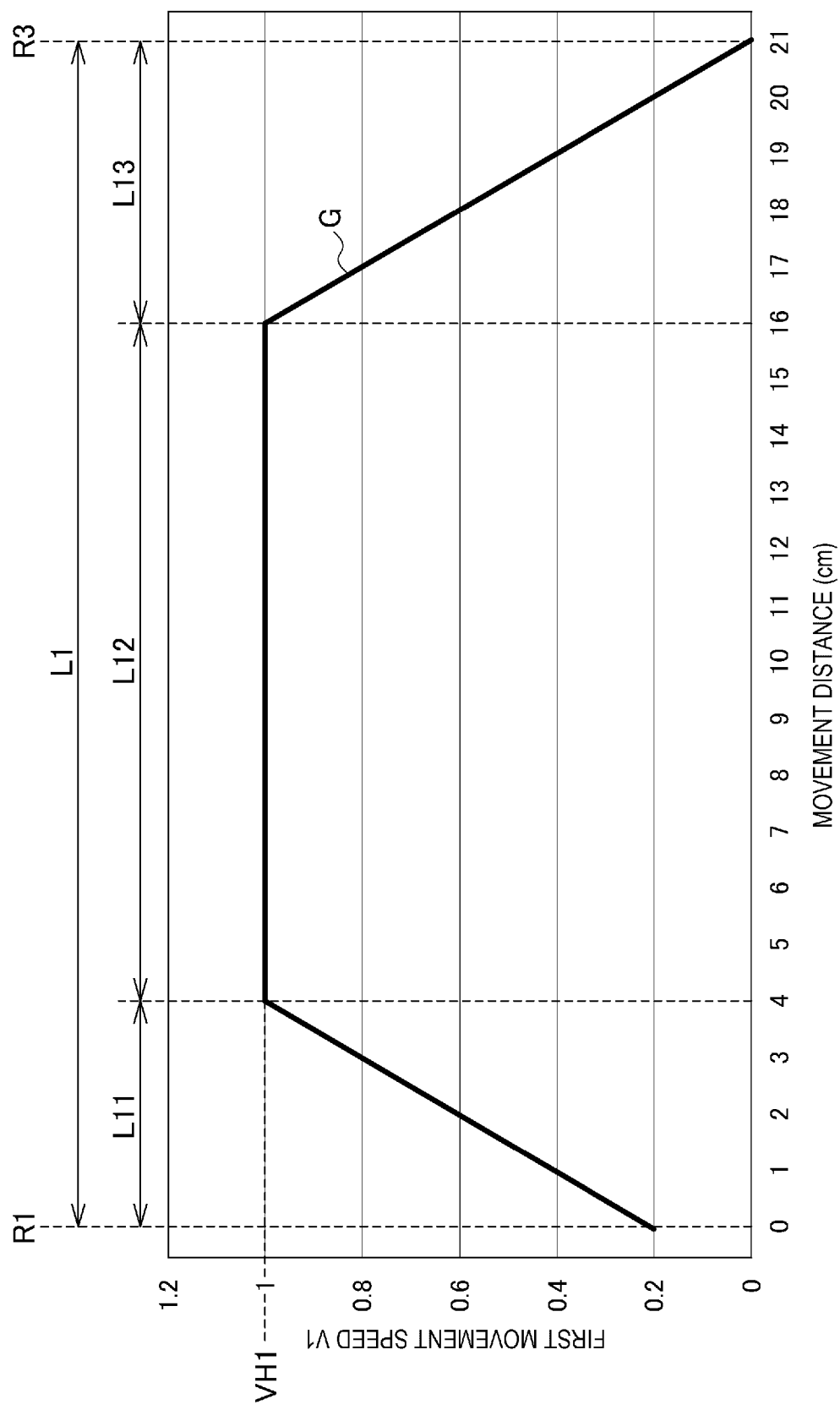
FIG. 6 is a graph showing an example of changes in a first movement speed of a first image.

FIG. 6 is a graph showing an example of changes in the first movement speed V1 of the first image PA displayed on the screen SC. The horizontal axis represents the movement distance L, and the vertical axis represents the first movement speed V1. A graph G represents changes in the first movement speed V1. The first movement speed V1 shown in FIG. 6 is set by the speed setting section 152.

In FIG. 6, the movement distance L is expressed in centimeters, and the first movement speed V1 is expressed in centimeters per frame. That is, the first movement speed V1 is expressed by the movement distance in one frame. The largest value of the movement distance L corresponds to the first distance L1. The first distance L1 is 21 cm in FIG. 6. The largest value of the first movement speed V1 corresponds to the first reference speed VH1. The first reference speed VH1 is 1 cm/fame in FIG. 6.

For example, when the first projector 100A displays the first image PA at 60 fps, one frame corresponds to 1/60 seconds. In this case, 1 cm/frame is 60 cm/second.

When the movement distance L is zero, the first image PA is located in the first region R1. The first movement speed V1 monotonously increases between a movement distance L of zero and a distance L11, as indicated by the graph G. In FIG. 6, the distance L11 is 4 cm, and the first movement speed V1 monotonously increases from 0.2 cm/frame to 1 cm/frame, which is the first reference speed VH1. Between the movement distances L of zero and the distance L11, the first movement speed V1 is smaller than the first reference speed VH1. The first movement speed V1 between the movement distances L of zero and the distance L11 is an example of the first decelerated speed VL1. The distance L11 corresponds to an example of the first threshold distance SL1.

The first movement speed V1 is the first reference speed VH1 when the movement distance L is between 4 cm and 16 cm, that is, when the movement distance L is between the distance L11 and a distance (L11+L12). The distance L12 is the distance from the movement distance L of 4 cm to the movement distance L of 16 cm.

The first movement speed V1 monotonously decreases from 1 cm/frame to 0 cm/frame when the movement distance L is between 16 cm and 21 cm, that is, the movement distance L is between the distance (L11+L12) and the first distance L1 (=L11+L12+L13). When the movement distance L is between 16 cm and 21 cm, the first movement speed V1 is smaller than the first reference speed VH1.

The first movement speed V1 between the movement distances L of 16 cm and 21 cm is an example of the third decelerated speed VL3. The distance L13 between the movement distances L of 16 cm and 21 cm corresponds to an example of the third threshold distance SL3.

When the movement distance L is 21 cm, the first image PA is located in the third region R3. In FIG. 6, the first threshold distance SL1 is 5 cm between the movement distances L of 16 cm and 21 cm.

As described with reference to FIG. 6, since the first movement speed V1 monotonously increases between the movement distances L of zero and the distance L11, the first image PA can be so displayed that the first image PA starts smoothly moving from the first region R1 toward the third region R3.

Furthermore, since the first movement speed V1 monotonically decreases between the movement distances L of the distance (L11+L12) and the first distance L1, the first image PA can be so displayed that the first image PA smoothly stops at the third region R3.

5. Processes Carried Out by Control Section

Figure 7:
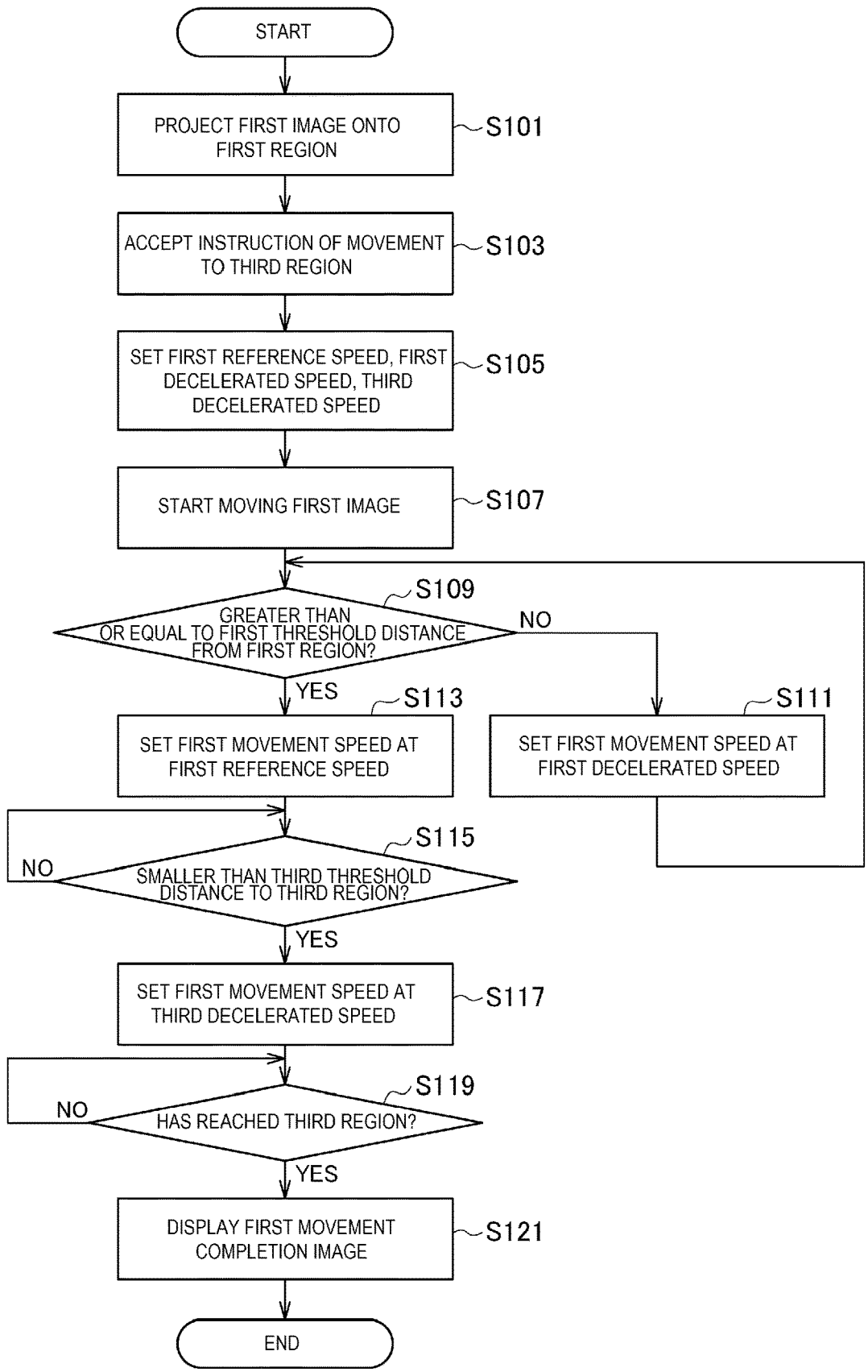
FIG. 7 is a flowchart showing an example of the processes carried out by the control section.

A specific example of the processes carried out by the control section 150 in the first projector 100A will next be described with reference to FIG. 7. FIG. 7 is a flowchart showing an example of the processes carried out by the control section 150 in the first projector 100A.

First, in step S101, the control section 150 projects the first image PA onto the first region R1 of the screen SC.

Thereafter, in step S103, the instruction accepting section 151 accepts the movement instruction of movement of the first image PA from the first region R1 to the third region R3.

Thereafter, in step S105, the speed setting section 152 sets the first movement speed V1 based on the first distance L1 from the first region R1 to the third region R3. Specifically, the speed setting section 152 sets the first decelerated speed VL1, the first reference speed VH1, and the third decelerated speed VL3 as the first movement speed V1.

Thereafter, in step S107, the movement executing section 153 starts moving the first image PA from the first region R1.

Thereafter, in step S109, the movement executing section 153 evaluates whether or not the distance from the first region R1 to the first image PA is greater than or equal to the first threshold distance SL1.

When the movement executing section 153 determines that the distance from the first region R1 to the first image PA is not greater than or equal to the first threshold distance SL1 (NO in step S109), the control section 150 proceeds to the process in step S111.

Thereafter, in step S111, the movement executing section 153 sets the first movement speed V1 at the first decelerated speed VL1. The control section 150 then returns to the process in step S109.

When the movement executing section 153 determines that the distance from the first region R1 to the first image PA is greater than or equal to the first threshold distance SL1 (YES in step S109), the control section 150 proceeds to the process in step S113.

Thereafter, in step S113, the movement executing section 153 sets the first movement speed V1 at the first reference speed VH1.

Thereafter, in step S115, the movement executing section 153 evaluates whether or not the distance from the first image PA to the third region R3 is smaller than the third threshold distance SL3.

When the movement executing section 153 determines that the distance from the first image PA to the third region R3 is not smaller than the third threshold distance SL3 (NO in step S115), the control section 150 transitions to a standby state. When the movement executing section 153 determines that the distance from the first image PA to the third region R3 is smaller than the third threshold distance SL3 (YES in step S115), the control section 150 proceeds to the process in step S117.

Thereafter, in step S117, the movement executing section 153 sets the first movement speed V1 at the third decelerated speed VL3.

Thereafter, in step S119, the movement executing section 153 evaluates whether or not the first image PA has reached the third region R3 and the second image PB has reached the fourth region R4. When the movement executing section 153, for example, receives from the second projector 100B information representing that the second image PB has reached the fourth region R4, the movement executing section 153 determines that the second image PB has reached the fourth region R4.

When the movement executing section 153 determines that the first image PA has not reached the third region R3 or the second image PB has not reached the fourth region R4 (NO in step S119), the control section 150 transitions to the standby state. When the movement executing section 153 determines that the first image PA has reached the third region R3 and the second image PB has reached the fourth region R4 (YES in step S119), the control section 150 proceeds to the process in step S121.

Thereafter, in step S121, the movement executing section 153 displays the first movement completion image PE1 as the first image PA. The processes are then terminated.

6. Present Embodiment and Effects and Advantages

As described with reference to FIGS. 1 to 7, the method for controlling the projectors 100 according to the present embodiment includes causing the first projector 100A to project the first image PA onto the first region R1 of the screen SC, causing the second projector 100B to project the second image PB onto the second region R2 of the screen SC, accepting an instruction of movement of the region where the first image PA is projected from the first region R1 to the third region R3 and movement of the region where the second image PB is projected from the second region R2 to the fourth region R4, and upon reception of the instruction, causing the first projector 100A to move the first image PA from the first region R1 to the third region R3 at the first movement speed V1 and causing the second projector 100B to move the second image PB from the second region R2 to the fourth region R4 at the second movement speed V2, and the first image PA projected onto the third region R3 and the second image PB projected onto the fourth region R4 form the single image PT.

According to the configuration described above, the first image PA is moved from the first region R1 to the third region R3 at the first movement speed V1, and the second image PB is moved from the second region R2 to the fourth region R4 at the second movement speed V2.

Setting the first movement speed V1 and the second movement speed V2 at appropriate values therefore allows the user to readily view the contents of the adjustment of the regions where the first image PA and the second image PB are projected. The convenience of the user can therefore be improved.

Furthermore, the first image PA projected in the third region R3 and the second image PB projected in the fourth region R4 form the single image PT.

Therefore, when the first image PA and the second image PB undergo what is called "tiling projection" or "stacking projection", the user can readily view the contents of the adjustment of the regions where the first image PA and the second image PB are projected.

The method for controlling the projectors 100 according to the present embodiment further includes causing the first projector 100A to project the first movement completion image PE1, which notifies the user of completion of the movement, as the first image PA when the first image PA has reached the third region R3 and the second image PB has reached the fourth region R4.

According to the configuration described above, the first projector 100A projects the first movement completion image PE1, which notifies the user of completion of the movement, as the first image PA when the first image PA has reached the third region R3 and the second image PB has reached the fourth region R4.

The user can therefore check that the first image PA has reached the third region R3 and the second image PB has reached the fourth region R4 by viewing the first movement completion image PE1. The convenience of the user can therefore be improved.

The method for controlling the projectors 100 according to the present embodiment further includes setting the first movement speed V1 based on the first distance L1 from the first region R1 to the third region R3 and setting the second movement speed V2 based on the second distance L2 from the second region R2 to the fourth region R4.

For example, the first movement speed V1 is set at a greater speed for a longer first distance L1, and the second movement speed V2 is set at a greater speed for a longer second distance L2.

The first movement speed V1 and the second movement speed V2 can therefore be set at appropriate speeds. Therefore, for example, the timing at which the first image PA reaches the third region R3 and the timing at which the second image PB reaches the fourth region R4 are allowed to substantially coincide with each other.

The method for controlling the projectors 100 according to the present embodiment further includes setting the first movement speed V1 at a speed greater than the second movement speed V2 when the first distance L1 from the first region R1 to the third region R3 is longer than the second distance L2 from the second region R2 to the fourth region R4 and setting the first movement speed V1 at a speed smaller than the second movement speed V2 when the first distance L1 from the first region R1 to the third region R3 is shorter than the second distance L2 from the second region R2 to the fourth region R4.

Therefore, for example, the timing at which the first image PA reaches the third region R3 and the timing at which the second image PB reaches the fourth region R4 are allowed to substantially coincide with each other.

The method for controlling the projectors 100 according to the present embodiment further includes setting the first movement speed V1 at the first reference speed VH1 when the distance from the first image PA to the third region R3 is greater than or equal to the third threshold distance SL3 and setting the first movement speed V1 at the third decelerated speed VL3, which is smaller than the first reference speed, when the distance from the first image PA to the third region R3 is shorter than the third threshold distance SL3.

Therefore, when the first image PA is moved from the first region R1 to the third region R3, the first movement speed V1 is reduced from the first reference speed to the third decelerated speed VL3 when the distance from the first image PA to the third region R3 becomes the third threshold distance SL3. The motion of the first image PA moving from the first region R1 to the third region R3 can therefore be smoothly displayed.

The method for controlling the projectors 100 according to the present embodiment includes causing the first projector 100A to project the first image PA onto the first region R1 of the screen SC, accepting an instruction of movement of the region where the first image PA is projected from the first region R1 to the third region R3, and upon reception of the instruction, causing the first projector 100A to move the first image PA from the first region R1 to the third region R3 at the first movement speed V1.

Setting the first movement speed V1 at an appropriate value therefore allows the user to readily view the content of the adjustment of the region where the first image PA is projected. The convenience of the user can therefore be improved.

The display system 1 according to the present embodiment includes the first projector 100A and the second projector 100B. The first projector 100A projects the first image PA onto the first region R1 of the screen SC, and the second projector 100B projects the second image PB onto the second region R2 of the screen SC. At least one of the first projector 100A and the second projector 100B accepts an instruction of movement of the region where the first image PA is projected from the first region R1 to the third region R3 and movement of the region where the second image PB is projected from the second region R2 to the fourth region R4. Upon reception of the instruction, the first projector 100A moves the first image PA from the first region R1 to the third region R3 at the first movement speed V1, and the second projector 100B moves the second image PB from the second region R2 to the fourth region R4 at the second movement speed V2. The first image PA projected onto the third region R3 and the second image PB projected onto the fourth region R4 form the single image PT.

According to the configuration described above, the first image PA is moved from the first region R1 to the third region R3 at the first movement speed V1, and the second image PB is moved from the second region R2 to the fourth region R4 at the second movement speed V2.

Setting the first movement speed V1 and the second movement speed V2 at appropriate values therefore allows the user to readily view the contents of the adjustment of the regions where the first image PA and the second image PB are projected. The convenience of the user can therefore be improved.

Furthermore, the first image PA projected in the third region R3 and the second image PB projected in the fourth region R4 form the single image PT.

Therefore, when the first image PA and the second image PB undergo what is called "tiling projection" or "stacking projection", the user can readily view the contents of the adjustment of the positions where the first image PA and the second image PB are displayed.

The display system 1 according to the present embodiment includes the first projector 100A, the second projector 100B, and the information processing apparatus. The first projector 100A projects the first image PA onto the first region R1 of the screen SC, and the second projector 100B projects the second image PB onto the second region R2 of the screen SC. The information processing apparatus accepts the first instruction information CM1 for moving the region where the first image PA is projected from the first region R1 to the third region R3 and the second instruction information CM2 for moving the region where the second image PB is projected from the second region R2 to the fourth region R4. Upon reception of the first instruction information CM1 and the second instruction information CM2, the first projector 100A moves the first image PA from the first region R1 to the third region R3 at the first movement speed V1 based on the first instruction information CM1, and the second projector 100B moves the second image PB from the second region R2 to the fourth region R4 at the second movement speed V2 based on the second instruction information CM2. The first image PA projected onto the third region R3 and the second image PB projected onto the fourth region R4 form the single image PT.

According to the configuration described above, the first image PA is moved from the first region R1 to the third region R3 at the first movement speed V1, and the second image PB is moved from the second region R2 to the fourth region R4 at the second movement speed V2.

Setting the first movement speed V1 and the second movement speed V2 at appropriate values therefore allows the user to readily view the contents of the adjustment of the regions where the first image PA and the second image PB are projected. The convenience of the user can therefore be improved.

Furthermore, the first image PA projected in the third region R3 and the second image PB projected in the fourth region R4 form the single image PT.

Therefore, when the first image PA and the second image PB undergo what is called "tiling projection" or "stacking projection", the user can readily view the contents of the adjustment of the positions where the first image PA and the second image PB are displayed.

7. Other Embodiments

The present embodiment described above is a preferable embodiment. The present disclosure is, however, not limited to the embodiment described above, and a variety of variations are conceivable to the extent that the variations do not depart from the substance of the present disclosure.

The present embodiment has been described with reference to the case where the region where the first projector 100A performs projection is moved from the first region R1 to the third region R3, but not necessarily. The region where the first projector 100A performs projection only needs to be adjusted. For example, at least one of the shape and area of the first region R1, where the projection is performed, may differ from those of the third region R3, where the projection is performed.

For example, when the position, shape, and area of the first region R1, where the projection is performed, differ from those of the third region R3, where the projection is performed, the effects of the present disclosure are further emphasized. For example, when the area of the third region R3 is greater than the area of the first region R1 in terms of area where the projection is performed, the display operation is preferably performed as follows: That is, during the movement of the first image PA from the first region R1 to the third region R3, the area of the projected first image P is gradually increased from the area of the first region R1 where the projection is performed toward the area of the third region R3 where the projection is performed.

The present embodiment has been described with reference to the case where the first projector 100A and the second projector 100B perform "tiling projection", but not necessarily. The first projector 100A and the second projector 100B may instead perform what is called "stacking projection". In this case, the first image PA projected onto the third region R3 is the entire movement completion image PE.

The functional portions shown in FIGS. 2 and 3 each represent a functional configuration and is not necessarily implemented in a specific form. That is, hardware corresponding to each of the functional portions is not necessarily implemented, and a single processor that executes a program can, of course, achieve the functions of the plurality of functional portions. Furthermore, part of the functions achieved by software in the embodiment described above may be achieved by hardware, or part of the functions achieved by hardware may be achieved by software. In addition, the specific detailed configuration of each of the other portions in the projectors 100 can be changed in any manner to the extent that the change does not depart from the intent of the present disclosure.

The process units in the flowchart shown in FIG. 7 are process units divided in accordance with the contents of the primary processes for easy understanding of the processes carried out by the control section 150. How to produce the divided process units or the names of the process units shown in the flowchart of FIG. 7 do not limit the embodiment of the present disclosure. The processes carried out by the control section 150 can each be further divided into a larger number of process units in accordance with the content of the process, and each of the process units can be divided such that a single process unit includes a large number of processes. Furthermore, the order in which the processes are carried out in the flowchart described above is not limited to that shown in FIG. 7.

The method for controlling the projectors 100 can be achieved by causing the processor 150A provided in each of the projectors 100 to execute the control program 154 corresponding to the method for controlling the projectors 100. The control program 154 can instead be recorded on a computer readable recording medium. The recording medium can be a magnetic or optical recording medium or a semiconductor memory device.

Specific examples of the recording medium may include a portable or immobile recording medium, such as a flexible disk, an HDD, a CD-ROM (compact disk read only memory), a DVD, a Blu-ray (registered trademark) Disc, a magneto-optical disk, a flash memory, and a card-shaped recording medium. The recording medium may instead be a RAM, a ROM, an HDD, or any other nonvolatile storage apparatus that is an internal storage apparatus provided in an image processing apparatus.

Still instead, the control program 154 corresponding to the method for controlling the projectors 100 may be stored, for example, in a server apparatus, and the control program 154 may be downloaded from the server apparatus to the projectors 100 to achieve the method for controlling the projectors 100.

The projectors 100 according to the present embodiment each have by way of example the configuration in which the light modulator 112 includes, for example, the three liquid crystal panels 115 corresponding to the three primary colors, R, G, and B, but not necessarily. For example, the light modulator 112 may be configured to use digital mirror devices. In this case, the movement executing section 153 of the first projector 100A may be operated so as to move the first image QA from the first region S1 to the third region S3 of each of the digital mirror devices, so that the first projector 100A moves the first image PA from the first region R1 to the third region R3 on the screen SC.

What is claimed is:

1. A projector controlling method comprising:
projecting, by a first projector, a first image onto a first region of a projection surface;
projecting, by a second projector, a second image onto a second region of the projection surface;
accepting an instruction of movement of a region where the first image is projected from the first region to a third region and movement of a region where the second image is projected from the second region to a fourth region;
upon reception of the instruction, moving the first image from the first region to the third region at a first movement speed by controlling the first projector, and moving the second image from the second region to the fourth region at a second movement speed by controlling the second projector;
setting the first movement speed based on a distance from the first region to the third region;
setting the second movement speed based on a distance from the second region to the fourth region;
setting the first movement speed at a speed greater than the second movement speed when the distance from the first region to the third region is longer than the distance from the second region to the fourth region; and
setting the first movement speed at a speed smaller than the second movement speed when the distance from the first region to the third region is shorter than the distance from the second region to the fourth region,
wherein the first image projected onto the third region and the second image projected onto the fourth region form a single image.

2. The projector controlling method according to claim 1, further comprising projecting, by the first projector, an image that notifies completion of the movement as the first image when the first image reaches the third region and the second image reaches the fourth region.

3. The projector controlling method according to claim 1, further comprising:
setting the first movement speed at a reference speed when the distance from the first image to the third region is greater than or equal to a predetermined distance, and
setting the first movement speed at a decelerated speed smaller than the reference speed when the distance from the first image to the third region is shorter than the predetermined distance.

4. A projector controlling method comprising:
projecting, by a projector, a first image onto a first region of a projection surface;
accepting an instruction of movement of a region where the first image is projected from the first region to a third region;
upon reception of the instruction, moving the first image from the first region to the third region at a first movement speed by controlling the projector;
setting the first movement speed at a reference speed when the distance from the first image to the third region is greater than or equal to a predetermined distance, and
setting the first movement speed at a decelerated speed smaller than the reference speed when the distance from the first image to the third region is shorter than the predetermined distance.

5. A display system comprising:
a first projector; and
a second projector,
wherein the first projector projects a first image onto a first region of a projection surface,
the second projector projects a second image onto a second region of the projection surface,
at least one of the first projector and the second projector accepts an instruction of movement of a region where the first image is projected from the first region to a third region and movement of a region where the second image is projected from the second region to a fourth region,
upon reception of the instruction, the first projector moves the first image from the first region to the third region at a first movement speed, and the second projector moves the second image from the second region to the fourth region at a second movement speed,
the first movement speed is set based on a distance from the first region to the third region;
the second movement speed is set based on a distance from the second region to the fourth region,
the first movement speed is set at a speed greater than the second movement speed when the distance from the first region to the third region is longer than the distance from the second region to the fourth region,
the first movement speed is set at a speed smaller than the second movement speed when the distance from the first region to the third region is shorter than the distance from the second region to the fourth region, and
the first image projected onto the third region and the second image projected onto the fourth region form a single image.

6. A display system comprising:
a first projector;
a second projector; and
a computer,
wherein the first projector projects a first image onto a first region of a projection surface,
the second projector projects a second image onto a second region of the projection surface,
the computer accepts first instruction information for moving a region where the first image is projected from the first region to a third region and second instruction information for moving a region where the second image is projected from the second region to a fourth region,
upon reception of the first instruction information and the second instruction information, the first projector moves the first image from the first region to the third region at a first movement speed based on the first instruction information, and the second projector moves the second image from the second region to the fourth region at a second movement speed based on the second instruction information,
the first movement speed is set based on a distance from the first region to the third region;
the second movement speed is set based on a distance from the second region to the fourth region,
the first movement speed is set at a speed greater than the second movement speed when the distance from the first region to the third region is longer than the distance from the second region to the fourth region,
the first movement speed is set at a speed smaller than the second movement speed when the distance from the first region to the third region is shorter than the distance from the second region to the fourth region, and
the first image projected onto the third region and the second image projected onto the fourth region form a single image.

* * * * *